ated Dec. 4, 1973

3,776,956
RESINOUS COMPOSITION

Izumi Yamane, Yokohama, Daini Saika, Funabashi, and Susumu Tomidokoro, Ichikawa, Japan, assignors to Lion Fat & Oil Co., Ltd., Yokoami, Sumida-ku, Tokyo, Japan
No Drawing. Filed Apr. 16, 1971, Ser. No. 134,851
Claims priority, application Japan, Apr. 25, 1970,
45/35,224, 45/35,225
Int. Cl. C07c 103/30
U.S. Cl. 260—561 N                              17 Claims

ABSTRACT OF THE DISCLOSURE

A method of synthesizing specific ethylenic type unsaturated acrylamide (I) by effecting dehydrohalogenation of a specific ethylenic type unsaturated carboxylic halide (II) or halogenated carboxylic halide (III) and a specific amine (IV), wherein a specific amine (V) is employed as a dehydrohalogenating agent; and a copolymer consisting of the foregoing compound (I) and a monomer capable of copolymerizing with said compound (I) as well as a resinous composition comprising said copolymer.

BACKGROUND OF THE INVENTION

(a) Field of the invention

The present invention relates to a method of preparing ethylenic type unsaturated amide having nonionic surface activity which constitutes an indispensable ingredient for use in providing a novel resinous composition having antistatic property, crispability, re-staining preventability, hydrophilic property, elasticity, etc. for the sake of maintaining these properties efficiently and permanently, and it further relates to a resinous composition containing said ethylenic type unsaturated amide.

(b) Description of the prior art

Synthetic resins and synthetic fibers in the prior art have been intrinsically hydrophobic and therefore possessed of various defects in quality. As the means of making up for said defects, it has been popular to use some low-molecular weight surface active agent to knead it with resins with a view to improving their properties. This means, however, is not so advisable in view of the fact that the surface active agent employed is just mixed with the resins so that a satisfactory effect thereof is not necessarily obtained, and it not only exudes to the surface of the resin but also gets scattered and lost therefrom to result in the decisive defect that a permanent retention of its efficiency cannot be expected. There have also been various attempts to modify the properties of resins permanently by means of copolymerizing some polymerizable monomers having surface activity to said resins, but, due to the difficulty involved in the process of synthesizing such monomers and the fact that the properties of the resulting copolymer are not satisfactory enough, no effective means has been found yet.

SUMMARY OF THE INVENTION

The object of the present invention is to provide an improved method of preparing ethylene-type unsaturated amide having nonionic surface activity which constitutes and indispensable ingredient for use in providing a novel resinous composition superior in antistatic property, crispability, re-staining preventability, hydrophilic property, elasticity, water absorbability, dyeing property, softness and antipilling property for the sake of maintaining these properties efficiently and permenently, and further to provide a resinous composition containing such ethylenic type unsaturated amide as above.

To be more precise, the present invention relates to an improved method of preparing ethylenic type unsaturated amide which is characterized in that, at the time of synthetizing ethylenic type unsaturated acrylamide having nonionic surface activity which is expressed by the following general Formula I:

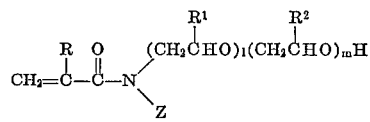

wherein R, $R^1$ and $R^2$ each represent H or alkyl radical having 1–4 carbon atoms and $R^1$ and $R^2$ can be either identical or different; Z represents H, alkyl radical having 1–12 carbon atoms, alkyl aryl radical which has and alkyl group having 1–12 carbon atoms, aryl alkyl radical which has an alkyl group having 1–12 carbon atoms, cycloalkyl radical having 3–6 carbon atoms, or $$\left(\underset{CH_2CHO}{\overset{R^1}{|}}\right)_{l'}\left(\underset{CH_2CHO}{\overset{R^2}{|}}\right)_{m'}H$$

$l$, $l'$, $m$ and $m'$ each represents a positive number, providing that $l+m$ and $l'+m'$ each represents a positive number ranging from 2 to 100)
through a dehydrohalogenation reaction between (1) an ethylenic type unsaturated carboxylic halide or halogenated carboxylic halide which is expressed by the following general Formula II:

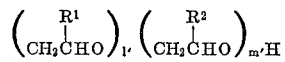

wherein R is the same as in the general Formula I and X represents halogen such as Cl, Br, etc.
or a compound of the Formula III:

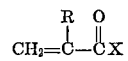

wherein R and X each is the same as in the general Formula II, and (2) primary or secondary amine having a polyalkylene oxide chain which is expressed by the following general Formula IV:

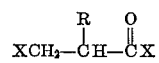

wherein $R^1$, $R^2$, Z, $l$ and $m$ each is the same as in the general Formula I.
Specific amines of the following general Formula V:

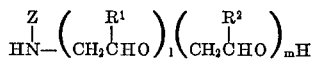

wherein $R^3$, $R^4$ and $R^5$ each represents a radical of the formula

alkyl radical having 1–12 carbon atoms, phenyl radical or aralkyl radical, providing that at least one of them has the foregoing radical expressed by

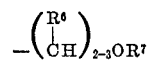

wherein $R^6$ represents H or alkyl radical having 1–3 carbon atoms, $R^7$ represents H or alkyl radical having 1–12 carbon atoms (preferably methyl radical or ethyl radical)

are employed as a dehydrogenating agent for the purpose of checking the esterification reaction, giving rise to the amidation reaction selectively, thereby producing ethylenic type unsaturated amide with high purity expressed by the foregoing general Formula I in high yield.

The present invention further relates to copolymers composed of ethylene-type unsaturated amide having nonionic surface activity and expressed by the foregoing general Formula I, which is produced by the above method, and aliphatic vinyl ester such as vinyl acetate, acrylonitrile, acrylic ester, methacrylic ester and styrene, vinyl chloride and other ethylenic type unsaturated compounds capable of copolymerizing with the ethylenic type unsaturated amide expressed by said general Formula I, as well as to the resinous compositions comprising said copolymers.

In the prior art, such compounds as N-(2-hydroxyethyl) acrylamide or N,N-di-(2-hydroxyethyl) acrylamide have been prepared by effecting reaction between acrylic chloride and monoethanol amine or diethanol amine in the presence of a dehydrochlorinating agent such as alkylamine, e.g. triethylamine, and such compounds as N-(polyoxyethylene) methacrylamide have been prepared by effecting reaction between methacrylamide and ethylene oxide in the presence of a benzene solvent. According to the former method, however, there is brought about a large amount of by-products such as acrylic aminoethyl ester, acrylic N-2-hydroxyethyl aminoethyl ester, etc. while, according to the latter method, there is brought about a large amount of polymer of N-(polyoxyethylene) methacrylamide as a by-product, so that it is impossible to obtain the intended product with high purity in high yield. The present invention affords a method of producing in high yield compounds expressed by the general Formula I having polyalkylene oxide chain, possessed of a satisfactory color tone within the molecule thereof and a high purity by means of a dehydrohalogenation reaction between an acid halide and an amine, which features the use of amine expressed by the general Formula V as a dehydrohalogenating agent to obtain the desired end product.

That is, the compound expressed by the general Formula I according to the present method can be obtained by making a compound expressed by the general Formula II or general Formula III such as ethylenic type unsaturated carboxylic halide or halogenated carboxylic halide, for instance, acrylic chloride, methacrylic chloride, $\beta$-chloropropionic chloride, $\beta$-chloro-$\alpha$-methylpropionic chloride, etc. react with an ether amine expressed by the general Formula IV in the presence of a dehydrohalogenating agent expressed by the general Formula V.

Among the ether amines expressed by the general Formula IV, the applicable compounds are those wherein $R^1$ and $R^2$ preferably represents H or $CH_3$, Z preferably represents H and $l+m$ is in the range of 5–100, and the optimum compound is one expressed by the formula $H_2N(CH_2CH_2O)_{5-100}H$. Among applicable dehydrochlorinating agents expressed by the general Formula V, the optimum compound is triethanol amine.

A characteristic feature of the present method is the use of an amine expressed by the general Formula V wherein oxygen is present in the $\beta$- or $\gamma$-position as the dehydrohalogenating agent, in effecting the amidation reaction between the carboxylic halide or halogenated carboxylic halide and the ether amine having hydroxyl radical.

In other words, in the case of amidation of a compound having hydroxyl radical, there usually takes place esterification concurrently therewith, leading to a lowering of the purity as well as the yield and deterioration of the color tone of the product. However, by virtue of application of the dehydrohalogenating agent according to the present invention, there is produced an intermediate having a 5–6 membered ring between the carboxylic halide or halogenated carboxylic halide and the amine expressed by the general Formula V, whereby amidation is selectively expedited, and as a result, the side reaction product is scarcely produced. Besides, in the case of the dehydrochlorinating agent used in the present method, the hydrohalogenated salt of amine coming from the reaction is so readily crystallized that it can be separated very easily from the intended product, and this also constitutes one of the excellent advantages of the present method. The solvent applicable in the reaction includes tetrahydrofuran, ethyl acetate, benzene, toluene, etc. but is not limited thereto, and any other solvent will do as long as it will not dissolve the hydrohalogenated salt of the amine. The reaction conditions are as follows.

Equivalent amounts of the ether amine expressed by the general Formula IV and the amine expressed by the general Formula V are dissolved in the solvent, and, while maintaining the reaction temperature in the range of from $-5°$ C. to room temperature (about 20° C.), an equivalent of the carboxylic halide expressed by the general Formula II, dissolved in separate solvent in advance is added dropwise therein. The reaction is effected under atmospheric pressure and is completed in 0.5–3 hours. The hydrohalogenated salt of the amine that settles out is filtered and thereafter the desired end product is separated from the solvent under reduced pressure, whereby there is simply obtained a compound expressed by the general Formula I with a sufficient purity. In case the halogenated carboxylic halide expressed by the general Formula III is used in lieu of the carboxylic halide expressed by the general Formula II, after effectuating the above process of reaction, a double bond is formed by means of a treatment with such strong alkali as sodium hydroxide, potassium hydroxide, etc. The details of this treatment are as described in relevant examples shown later on.

As set forth in the foregoing, synthetic resins and synthetic fibers are intrinsically hydrophobic and therefore are defective in various properties from the viewpoint of efficiency. The present inventors have energetically conducted a series of studies to find out a means of improving particularly the antistatic property, crispability, re-staining preventability, hydrophilic property, elasticity, water-absorbability, dyeing property, softness, antipilling property, etc. and also maintaining them efficiently and permanently, and, as a result, they have discovered that it is possible to produce resins having excellent properties by means of copolymerization between the ethylenic type unsaturated amide expressed by the general Formula I which has polyalkylene oxide chains within the molecule thereof and other ethylenic type unsaturated monomers.

The present invention also relates to a copolymerized composition comprising the ethylenic type unsaturated compound expressed by the general Formula I and other ethylenic type unsaturated compound.

The desirable one among the compounds expressed by the general Formula I is one having a molecular structure composed of repeating ethoxyl radicals and/or propoxyl radicals, because, not only the hydrophilic property, etc. can be improved as a result of the increase in the number of ether bonds but also the production of a copolymerized composition having various excellent properties, not to speak of the hydrophilic property and antistatic property, is feasible by controlling the composition ratio of the copolymer consisting of the ethylenic type unsaturated amide expressed by the general Formula I and the other ethylenic type unsaturated compound. The particularly desirable one among the compounds expressed by the general Formula I is acrylic or methacrylic amide of alkanol amide consisting of molecules having one or two polyoxyethylene chains of 5–100 moles each.

To cite the ethylenic type unsaturated compounds capable of copolymerizing with the ethylenic type unsaturated amide expressed by the general Formula I, there are such compounds as acrylonitrile, acrylic acid, methacrylic acid as well as their esters, styrene and styrene derivatives, vinyl chloride, vinylidene chloride and vinyl acetate as well as their homologue, vinyl pyridine and maleic acid as well as their anhydrides or esters, itaconic acid as well as its anhydride or ester, butadiene, etc., of which acrylonitrile, styrene, vinyl chlorinde, vinyl acetate, acrylic ester and methacrylic ester are especially desirable.

The desirable copolymer for use in the present invention is one containing the compound according to the general Formula I in the amount of 1–50 wt. percent and having a polymerization degree of 5–1000. Preparation of such copolymer is feasible by the use of an initiator capable of generating a radical such as benzoyl peroxide, azobisisobutronitrile, persulfate, etc. in the presence of a nitrogen current by bulk polymerization, slurry polymerization, dispersion polymerization, emulsion polymerization and solution polymerization, which are all applicable without any limitation.

The copolymer according to the present invention is superior to the conventional resins in respect of its antistatic property, crispability, water-absorbability, dyeing property, softeness, antipilling property, hydrophilic property, elasticity, re-stainning preventability, etc. and this superiority is particularly conspicuous in respect of the antistatic property, crispability, hydrophilic property and re-staining preventability.

These excellent properties of the present copolymers are attributable to the structure of copolymer. And, when compared with conventional compositions such as those prepared by surface treatment of resins with various compounds or prepared by kneading various additives into resins, this copolymer not only retains its efficiency permanently but also never gives rise to such undesirable phenomena as deterioration of the property of matter. Moreover, it does not require such processes as surface treatment, kneading, etc.

The copolymerized composition according to the present invention is capable of mixing with single or plural members selected from the group consisting of plasticizer, stabilizer, colorant, extender, etc. as occasion demands, and it can be utilized as moldings in the form of fiber, film sheet and others, and also as a fiber modifying agent, coating agent, adhesive, thickener, additive for lubricating oil, paint, lacquer, etc.

The present copolymer not only can be used independently as set forth above but also is capable of bringing about the intended effect satisfactorily even when mixed with such compounds as acrylonitrile-butadiene-styrene copolymers (ABS resin), polyacrylonitrile, polymethyl methacrylate, polystyrene, polyvinyl chloride, polyethylene, etc. On this occasion, for the purpose of improving its solubility with the other resin, it is desirable that the copolymer for use in mixing with the thermoplastic resin be a copolymer comprising the monomer constituting said thermoplastic resin as far as possible, but this is not necessarily limiting. The mixing rate of the copolymer to the thermoplastic resin is in the range of 1–50 wt. percent—preferably 2–20 wt. percent—of the total amount of resin employed.

DESCRIPTION OF THE PREFERRED EMBODIMENTS

Preparation of the Compound I

Example 1

23.1 g. (0.05 mol) of ω-hydroxy polyoxyethylene monoamine [wherein the ethylene oxide polymerization degree (hereinafter expressed by $n$) is 10.1 and molecular weight is 461] and 7.5 g. (0.05 mol) of triethanolamine were dissolved in 160 ml. of tetrahydrofuran, and while stirring the resulting mixture, 40 ml. of tetrahydrofuran containing 4.6 g. (0.05 mol) of acrylic chloride and 500 p.p.m. of hydroquinone monomethyl ether was dripped slowly therein while maintaining the reaction temperature in the range of 0–5° C. After finishing the addition the hydrochloride of ethanol amine thus precipitated was filtered, and the filtrate was treated to remove the solvent under reduced pressure, whereby N-(ω-hydroxy polyoxyethylene) acrylamide in the state of a light yellow-colored viscous liquid was obtained at a yield of 97% and purity of 95%. By applying the same process as above, N-(ω-hydroxy polyoxyethylene) acrylamides with $n$ therein representing 2 and 5, respectively, were produced at yields of 95 and 97% and purities of 94 and 93%, respectively.

Example 2

In synthetizing the same N-(ω-hydroxy polyoxyethylene) acrylamide as that in Example 1, by modifying the kind of dehydrochlorinating agent used as shown in Table 1 and applying the same process as in Example 1, ω-hydroxy polyoxyethylene monoamine (wherein $n$ represents 10.1) was made to react with acrylic chloride. As is clear from Table 1, in case the tertiary alkanol amine such as triethanol amine or dimethyl ethanol amine was employed as the dehydrochlorinating agent, there takes place amidation selectively.

TABLE 1

| | Dehydrochlorinating agent | Ratio of amide to esterified part within the product (wt. percent) |
|---|---|---|
| Product under the present invention. | Triethanol amine | 98:2 |
| | Dimethyl ethanol amine | 97:3 |
| Comparative product. | Triethyl amine | 55:45 |
| | Dimethyl formamide | 48:52 |
| | Monoethanol amine | |
| | Pyridine | |
| | Dimethyl aniline | (¹) |
| | Aniline | |

¹ Accompanied with various side reactions, leading to remarkable lowering of yield rate.

EXAMPLE 3

23.1 g. of the same ω-hydroxy polyoxyethylene monoamine as employed in Example 1 and 7.5 g. of triethanol amine were dissolved in 160 ml. of tetrahydrofuran, and, while stirring the resulting mixture, 40 ml. of tetrahydrofuran containing 5.2 g. of methacrylic chloride and 500 p.p.m. of hydroquinone monomethyl ether was dripped slowly therein so as to maintain the reaction temperature of 0–5° C. After finishing the addition, the hydrochloride of triethanol amine thus precipitated was filtered, and the filtrate was treated to remove the solvent under reduced pressure, whereby N-(ω-hydroxy polyoxyethylene) methacrylamide in the state of a light yellow-colored viscous liquid was obtained at the yield rate of 96% (and purity of 95%). By applying the same process as above, N-(ω-hydroxy polyoxyethylene) methacrylamides with $n$ therein representing 2 and 5, respectively, were produced at the yield rate of 90 and 90%, and the purity of 92, and 94%, respectively.

EXAMPLE 4

By making N,N-di(ω-hydroxy polyoxyethylene) monoamine ($n$=10.3) react with acrylic chloride through the same process as in Example 1, N,N-di(ω-hydroxy polyoxyethylene) acrylamide was obtained at the yield rate of 93% (and purity of 90%). By applying the same process, N,N-di(ω-hydroxy polyoxyethylene) acrylamide with $n$ therein representing 2, 5 and 20 respectively were produced at the yield of 89, 90 and 96%, and the purity of 85, 87 and 94%, respectively.

EXAMPLE 5

200 ml. of ethyl acetate solution containing 46.1 g. of ω-hydroxy polyoxyethylene monoamine ($n$=10.1, molecular weight=461) and 14.9 g. of triethanol amine were placed in a 300-ml. four-neck flask equipped with the stirrer, thermometer, condenser and dropping funnel, and 12.7 g. of β-chloropropionic chloride was added dropwise into the reactants while maintaining the reaction temperature of 0–5° C. After finishing the addition, the resulting mixture was continuously subjected to 30 minutes' reaction at the same temperature. Upon completion of the reaction, hydrochloride of triethanol amine precipitated in the flask was filtered and then the filtrate was treated to remove the solvent under reduced pressure, whereby 55.1 g. of N-(ω-hydroxy polyoxyethylene) β-chloropropionamide in the state of a light yellow-colored viscous liquid was obtained. Subsequently, this amide in the amount of 55.1 g. and 55.1 mg. of hydroquinone monomethyl ether were dissolved in 150 ml. of methanol and placed in a 300-ml. four-neck flask equipped with the stirrer, thermometer, condenser and dropping funnel. Then, a solution prepared by dissolving 4 g. of sodium hydroxide in 20 ml. of methanol was added dropwise into the reactants at the reaction temperature of 15–20° C., and the resulting mixture was further subjected to 30 minutes' reaction at the same temperature. Upon completion of the reaction, the salt precipitated in the flask was filtered and the filtrate was treated to remove the solvent under reduced pressure, whereby N-(ω-hydroxy polyoxyethylene) acrylamide in the state of a light yellow-colored viscous liquid was obtained at the yield rate of 95% (and purity of 92%).

EXAMPLE 6

By using β-chloro-α-methylpropionic chloride in lieu of β-chloropropionic chloride and applying the same process as in Example 5, N-(ω-hydroxy polyoxyethylene) methacrylamide in the state of a light yellow-colored viscous liquid was obtained at the yield rate of 95% (and purity of 93%).

Example 7

By making N-(ω-hydroxy polyoxyethylene)-N-n-butyl monoamine ($n=10.1$) react with acrylic chloride in the presence of triethanol amine through the same process as in Example 1, N-(ω-hydroxy polyoxyethylene)-N-n-butyl acrylamide was obtained at the yield rate of 95% (and purity of 93%). This product was a yellow-colored viscous liquid. By applying the same process, N-(ω-hydxy polyoxyethylene)-N-n-butyl acrylamides with $n$ therein representing 2, 5 and 20 respectively were produced at the yield of 85, 87 and 95%, and the purity of 89, 91 and 92%, respectively.

Example 8

By making N-(ω-hydroxy polyoxyethylene)-N-cyclohexyl monoamine ($n=10.1$) react with acrylic chloride through the same process as in Example 1, N-(ω-hydroxy polyoxyethylene)-N-cyclohexyl acrylamide was obtained at the yield of 95% (and purity of 91%). By applying the same process, N-(ω-hydroxy polyoxyethylene)-N-cyclohexylamide with $n$ therein representing 2, 5 and 20 respectively were produced at the yield of 90, 90 and 94% and purity of 88, 89, and 90%, respectively.

Example 9

By making N-(ω-hydroxy polyoxyethylene)-N-phenylmonoamine ($n=10.1$) react with acrylic chloride through the same process as in Example 1, N-(ω-hydroxy polyoxyethylene)-N-phenyl acrylamide was obtained at the yield of 94% (and purity of 90%). By applying the same process, N-(ω-hydroxy polyoxyethylene)-N-phenyl acrylamide with $n$ therein representing 2, 5 and 20 respectively were produced at the yield of 91, 90 and 93% and purity of 89, 92 and 95%, respectively.

Example 10

106.1 g. (0.05 mol) of ω-hydroxy polyoxyethylene monoamine ($n=47.6$, molecular weight=2115) and 7.6 g. (0.05 mol) of triethanol amine were dissolved in 600 ml. of benzene, and, while stirring the resulting mixture, 50 ml. of benzene solution containing 4.5 g. (0.05 mol) of acrylic chloride and 500 p.p.m. of hydroquinone monomethyl ether was added dropwise slowly therein while maintaining the reaction temperature at 8–12° C. After finishing the addition, hydrochloride of triethanol amine thus precipitated was filtered, and then the reaction product was precipitated by adding benzene solution to overabundant n-hexane, filtered and dried, whereby N-(ω-hydroxy polyoxyethylene) acrylamide in the form of a white solid matter was obtained at the yield of 97% and purity of 99%. The melting point of this product was 48.4° C.

By applying the same process as above, N-(ω-hydroxy polyoxyethylene) acrylamides were synthesized by the use of ω-hydroxypolyoxyethylene monoamine with $n$ therein representing 20.7, 33.3 and 94.7 respectively. The result was as shown in Table 3.

Example 11

Amidation reaction was effected between ω-hydroxy polyoxyethylene monoamines with $n$ therein representing 20.7, 33.3, 47.6 and 94.7 respectively and acrylic chloride with various dehydrochlorinating agents.

As is clearly seen from Table 2, in case a tertiary alkanol amine such as triethanol amine or dimethyl ethanol amine is applied as the dehydrochlorinating agent, there takes place amidation selectively.

Example 12

By making 107 g. of ω-hydroxy polyoxyethylene monoamine ($n=47.6$; molecular weight=2115) react with 5.3 g. of methacrylic chloride through the same process as in Example 10, N-(ω-hydroxy polyoxyethylene) methacrylamide was obtained at the yield of 96% and purity of 98%. The melting point of this product was 48.6° C.

Example 13

By applying the same process as in Example 12, N-(ω-hydroxy polyoxyethylene) methacrylamides were synthesized by the use of ω-hydroxy polyoxyethylene monoamine with $n$ therein representing 20.7, 33.3 and 94.7 respectively. The result was as shown in Table 5.

Example 14

24.2 g. (0.05 mol) of ω-hydroxy poly(oxyethylene-oxypropylene) monoamine (wherein, ethylene oxide content=90 mol percent, molecular weight=480) and 7.5 g. (0.05 mol) of triethanol amine were dissolved in 150 ml. of tetrahydrofuran, and, while stirring the resulting mixture, 50 ml. of tetrahydrofuran solution containing 4.5 g. of acrylic chloride and 500 p.p.m. of hydroquinone monomethyl ether was dripped slowly therein while maintaining the reaction temperature at 0–50° C. After finishing the addition, hydrochloride of triethanol amine thus precipitated was filtered and the filtrate was treated to remove the solvent under reduced pressure, whereby N-[ω-hydroxy poly (oxyethyleneoxypropylene)] acrylamide in the state of a light yellow-colored viscous liquid was obtained at the yield of 98% and purity of 93%.

Example 15

By applying the same process in Example 10 or Example 14, N-[ω-hydroxy poly(oxyethylene-oxypropylene)] acrylamides with various ethylene oxide content as well as polymerization degree of ethylene oxide and propylene oxide were synthesized. The result was as shown in Table 4.

Example 16

By making 60.8 g. of ω - hydroxy polyoxypropylene monoamine (wherein, propylene oxide polymerization degree=20.4, molecular weight=1204) react with 4.5 g. of acrylic chloride through the same process as in Example 9, N-(ω-hydroxy polyoxypropylene) acrylamide was obtained at the yield of 95% and purity of 96%. The melting point of this product was 38.2° C.

TABLE 2

| | Ethylene oxide polymerization degree | Dehydrochlorinating agent | Ratio of esterified part to amidated part within the product |
|---|---|---|---|
| Product under the present invention. | 20.7 | Triethanol amine | 99:1 |
| | | Dimethyl ethanol amine | 98:1 |
| | 33.3 | Triethanol amine | 99:1 |
| | | Dimethyl ethanol amine | 98:1 |
| | 47.6 | Triethanol amine | 100:0 |
| | | Dimethyl ethanol amine | 99:1 |
| | 94.7 | Triethanol amine | 100:0 |
| | | Dimethyl ethanol amine | 99:1 |
| Comparative product. | 20.7 | Triethyl amine | 60:40 |
| | 33.3 | | |
| | 47.6 | | 65:35 |
| | 74.7 | | |
| | 20.7 | Pyridine, dimethyl aniline | (¹) |
| | 33.3 | | |
| | 47.6 | | |
| | 94.7 | | |

¹ Accompanied with various side reactions, leading to remarkable lowering of yield.

TABLE 3

| Example number | Ethylene oxide polymerization degree ($n$) | Solvent | Reaction temperature, °C. | Percent Yield | Percent Purity | Melting point, °C. |
|---|---|---|---|---|---|---|
| 10 | 20.7 | Tetrahydrofuran | 3–8 | 94 | 96 | 28.5 |
| | 33.3 | do | 5–10 | 96 | 96 | 43.8 |
| | 94.7 | Benzene | 7–13 | 98 | 98 | 51.8 |

TABLE 4

| Example number | Ethylene oxide content (mol percent) | Ethylene oxide polymerization degree ($n$) | Solvent | Reaction temperature, °C. | Percent Yield | Percent Purity | Melting point, °C. |
|---|---|---|---|---|---|---|---|
| 15 | 90 | 21.5 | Tetrahydrofuran | 0–5 | 95 | 95 | 28.3 |
| | 90 | 45.7 | Benzene | 10 | 93 | 97 | 47.7 |
| | 80 | 10.4 | Tetrahydrofuran | 0–5 | 95 | 94 | Liquid |
| | 80 | 20.1 | do | 0–5 | 94 | 94 | 28.5 |
| | 80 | 53.3 | Benzene | 7–15 | 96 | 98 | 49.1 |
| | 50 | 12.2 | Tetrahydrofuran | 0–5 | 96 | 94 | Liquid |
| | 50 | 48.9 | Benzene | 10–15 | 95 | 98 | 51.2 |

TABLE 5

| Example number | Ethylene oxide polymerization degree ($n$) | Solvent | Reaction temperature, °C. | Percent Yield | Percent Purity | Melting point, °C. |
|---|---|---|---|---|---|---|
| 13 | 20.7 | Tetrahydrofuran | 3–8 | 95 | 96 | 28.6 |
| | 33.3 | do | 5–10 | 95 | 96 | 43.5 |
| | 94.7 | Benzene | 7–13 | 97 | 98 | 52.0 |

Preparation of the Copolymer and the Resinous Compositions

Example 17

45.0 g. of acrylonitrile and 5.0 g. of N-(ω-hydroxy polyoxyethylene) acrylamide [molecular formula:

$$CH_2=CHCONH—(CH_2CH_2O)_{10.1}H$$

hereinafter called HPOA for short] (weight ratio=9:1) were dissolved in 800 ml. of deionized water, and, after adding thereto 0.4 g. of sulfuric acid, stirring the mixture in the presence of $N_2$ current and heating (at 30–35° C.), 200 ml. of aqueous solution of redox catalyst (comprising 1.71 g. of amonium persulfate and 0.71 g. of metasodium bisulfite) divided into 6 parts are added dropwise therein by means of applying these parts at intervals of 30–40 minutes. The resulting white sediment was filtered and dried, whereby there was obtained 49.1 g. of a white copolymer (yield: 98.1%). Nitrogen analysis according to Kjeldahl method of semi-microanalysis showed that this copolymer was composed of 89.4% of acrylonitrile and 10.6% of HPOA by weight.

Further, by making the ratio of acrylonitrile to HPOA to be 98:2 and 95:5 by weight, a couple of copolymers similar to one above were prepared. The weight percent of HPOA contained in these copolymers were 2.1% and 5.3% respectively. When these copolymers were made into film and measured as regards their contact angle, electric chargeability and specific degree of stain, they proved to have superior quality compared with those homopolymers of the same degree of polymerization which do not contain the amide according to the present invention, as shown in Table 6. This fact attests to the superiority of the present copolymer in hydrophilic property, antistatic property and re-staining preventability.

Example 18

By the use of 47.5 g. of acrylonitrile and 2.5 g. of N-(ω-hydroxy polyoxyethylene) acrylamide [wherein $$CH_2=CHCONH(CH_2CH_2O)_2H$$

hereinafter called HPOA for short] (at the ratio of 95:5 by weight) and through the same process as in Example 10, 46.5 g. of white copolymer was obtained (yield: 93.0%). Nitrogen analysis according to Kjeldahl method of semi-microanalysis showed that this copolymer was composed of 94.8% of acrylonitrile and 5.2% of HPOA. The properties of this product were as shown in Table 6.

Example 19

By the use of 47.5 g. of acrylonitrile and 2.5 g. of N-(ω-hydroxy polyoxyethylene) acrylamide [$n=5$ hereinafter called HPOA for short (at the ratio of 95:5 by weight)] and through the same process as in Example 17, a copolymer composed of 94.5% of acrylonitrile and 5.5% of HPOA by weight was obtained. The properties of this product were as shown in Table 6.

Example 20

45.0 g. of acrylonitrile and 5.0 g. of N-(ω-hydroxy polyoxyethylene) acrylamide [molecular formula:

$$CH_2=CH_2CONH(CH_2CH_2O)_{20.7}H$$

hereinafter called HPOA for short] (weight ratio=9:1) were dissolved in 800 ml. of deionized water, and, after adding thereto 0.4 g. of sulfuric acid, stirring the mixture in the presence of $N_2$ current and heating (at 30–35° C.), 200 ml. of aqueous solution of redox catalyst (comprising 1.71 g. of ammonium persulfate and 0.71 g. of metasodium bisulfite) divided into 6 parts was added dropwise therein by means of applying these parts at intervals of 30–40 minutes. The resultng white sediment was filtered and dried, whereby there was obtained 49.3 g. of a white copolymer (yield: 98.6%). Nitrogen analysis according to Kjeldahl method of semi-microanalysis showed that this copolymer was composed of 90.2% of acrylonitrile and 9.8% of HPOA by weight.

Further, by making the ratio of acrylonitrile to HPOA to be 98:2 and 95:5 by weight, a couple of copolymers similar to one above were prepared. The weight percent of HPOA contained in these copolymers were 1.9 and 5.1% respectively. When these copolymers were made into film and measured as regards their contact angle, electric chargeability and specific degree of stain, they proved to have superior quality compared with those homopolymers of the same acrylonitrile which do not contain the amide according to the present invention, as shown in Table 6. This fact attests to the hydrophilic property, antistatic property and re-staining preventability of the present copolymer.

Example 21

45.0 g. of acrylonitrile and 5.0 g. of N-(ω-hydroxy polyoxyethylene) acrylamide [molecular formula:

$$CH_2=CHCONH(CH_2CH_2O)_{47.6}H$$

hereinafter called HPOA for short] (weight ratio=9:1) were dissolved in 800 ml. of deionized water, and, after adding there to 0.4 g. of sulfuric acid, stirring the mixture in the presence of $N_2$ current and heating (at 30–35° C.), 200 ml. of aqueous solution of redox catalyst (comprising 1.71 g. of ammonium persulfate and 0.71 g. of metasodium bisulfite) divided into 6 parts was added dropwise thereby by means of applying these parts at intervals of 30–40 minutes. The resulting white sediment was filtered and dried, whereby there was obtained 49.2 g. of a white copolymer. Nitrogen analysis according to Kjeldahl method of semi-microanalysis showed that the weight percent of HPOA within this copolymer was 9.9%.

Further, by making the ratio of acrylonitrile and HPOA to be 98.2 and 95:5 by weight, a couple of copolymers similar to one above were prepared. The weight percent of HPOA contained in these copolymers were 1.9% and 5.0% respectively. When these copolymers were made into film and measured as regards their contact angle, electric chargeability and specific degree of stain, they proved to have superior quality compared with those homopolymers of acrylonitrile which do not contain the amide according to the present invention, as shown in Table 6. This fact attests to the hydrophilic property, antistatic property and re-staining preventability of the present copolymer.

Example 22

45.0 g. of acrylonitrile and 5.0 g. of N-(ω-hydroxy polyoxyethylene) acrylamide [molecular formula:

$$CH_2=CHCONH(CH_2CH_2O)_{94.7}H$$

hereinafter called HPOA for short] (weight ratio=9:1) were dissolved in 800 ml. of deionized water, and, after adding thereto 0.4 g. of sulfuric acid, stirring the mixture in the presence of $N_2$ current and heating (at 30–35° C.), 200 ml. of aqueous solution of redox catalyst (comprising 1.71 g. of ammonium persulfate and 0.71 g. of metasodium bisulfite) divided into 6 parts was added dropwise therein by means of applying these parts at intervals of 30–40 minutes. The resulting sediment was filtered and dried, whereby there was obtained 48.8 g. of a white copolymer. Nitrogen analysis according to Kjeldahl method of semi-microanalysis showed that the weight percent of HPOA within this copolymer was 9.7%.

Further, by making the ratio of acrylonitrile to HPOA to be 98:2 and 95:5 by weight, a couple of copolymers similar to one above were prepared. The weight percent of HPOA contained in these copolymers were 1.9 and 4.9% respectively. When these copolymers were made into film and measured as regards their contact angle, electric chargeability and specific degree of stain, they proved to have superior quality compared with those homopolymers of acrylonitrile which do not contain the amide according to the present inventon, as shown in Table 6. This fact attests to the hydrophilic property, antistatic property and re-staining preventability of the present copolymer.

Example 23

30 g. of acrylonitrile and 20 g. of N-(ω-hydroxy polyoxyethylene) acrylamide [molecular formula:

$$CH_2=CHCONH(CH_2CH_2O)_{10.1}H$$

hereinafter called HPOA for short] (weight ratio=60:40) were dissolved in 800 ml. of deionized water, and, after adding thereto 0.4 g. of sulfuric acid, stirring the mixture in the presence of $N_2$ current and heating (at 30–35° C.), 200 ml. of aqueous solution of redox catalyst (comprising 1.71 g. of ammonium persulfate and 0.71 g. of metasodium bisulfite) divided into 6 parts was added dropwise therein by means of applying these parts at intervals of 30–40 minutes. The resulting white sediment was filtered and dried, whereby there was obtained 42.3 g. of a white copolymer. Nitrogen analysis according to Kjeldahl method of semi-microanalysis showed that HPOA content in this copolymer was 34.3% by weight.

When a couple of dimethyl formamide solutions, one consisting of 10 parts of the foregoing copolymer and 90 parts of polyacrylonitrile and the other consisting of 20 parts of said copolymer and 80 parts of polyacrylonitrile, were made into film and measured as regards their contact angle, electric chargeability and specific degree of stain, they proved to have superior quality compared with homopolymers as shown in Table 6.

Example 24

30 g. of acrylonitrile and 20 g. of N-(ω-hydroxy polyoxyethylene) acrylamide [molecular formula:

$$CH_2=CHCONH(CH_2CH_2O)_{20.7}H$$

hereinafter called HPOA for short] (weight ratio=60:1) were dissolved in 800 ml. of deionized water, and, after adding thereto 0.4 g. of sulfuric acid, stirring the mixture in the presence of $N_2$ current and heating (at 30–35° C.), 200 ml. of aqueous solution of redox catalyst (comprising 1.71 g. of ammonium persulfate and 0.71 g. of metasodium bisulfite) divided into 6 parts was added dropwise therein by means of applying these parts at intervals of 30–40 minutes.

The resulting white sediment was filtered and dried, whereby there was obtained 42.0 g. of a white copolymer. Nitrogen analysis according to Kjeldahl method of semi-microanalysis showed that HPOA content in this copolymer was 34.7% by weight.

When a couple of dimethyl formamide solutions, one consisting of 10 parts of the foregoing copolymer and 90 parts of polyacrylonitrile and the other consisting of 20 parts of said copolymer and 80 parts of polyacrylonitrile, were made into film and measured as regards their contact angle, electric chargeability and specific degree of stain, they proved to have superior quality compared with homopolymers as shown in Table 6.

Example 25

30 g. of acrylonitrile and 20 g. of N-(ω-hydroxy polyoxyethylene) acrylamide [molecular formula:

$$CH_2=CHCONH(CH_2CH_2O)_{33.3}H$$

hereinafter called HPOA for short] were dissolved in 800 ml. of deionized water, and, after adding thereto 0.4 g. of sulfuric acid, stirring the mixture in the presence of $N_2$ current and heating (at 30–35° C.), 200 ml. of aqueous solution of redox catalyst (comprising 1.71 g. of ammonium persulfate and 0.71 g. of metasodium bisulfite) divided into 6 parts was dripped therein by means of applying these parts at intervals of 30–40 minutes.

The resulting white sediment was filtered and dried, whereby there was obtained 43.3 g. of a white copolymer. Nitrogen analysis according to Kjeldahl method of semi-microanalysis showed that HPOA content in this copolymer was 33.8% by weight.

When a couple of dimethyl formamide solutions, one consisting of 10 parts of the foregoing copolymer and 90 parts of polyacrylonitrile and the other consisting of 20 parts of said copolymer and 80 parts of polyacrylonitrile, were made into film and measured as regards their contact angle, electric chargeability and specific degree of stain, they proved to have superior quality compared with homopolymers as shown in Table 6.

Example 26

30 g. of acrylonitrile and 20 g. of N-(ω-hydroxy polyoxyethylene) acrylamide [molecular formula:

$$CH_2=CHCONH(CH_2CH_2O)_{47.6}H$$

hereinafter called HPOA for short] were dissolved in 800 ml. of deionized water, and, after adding thereto 0.4 g. of sulfuric acid, stirring the mixture in the presence of $N_2$ current and heating (at 30–35° C.), 200 ml. of aqueous solution of redox catalyst (comprising 1.71 g. of ammonium persulfate and 0.71 g. of metasodium bisulfite) divided into 6 parts was added dropwise therein by means of applying these parts at intervals of 30–40 minutes.

The resulting white sediment was filtered and dried, whereby there was obtained 42.8 g. of a white copolymer. Nitrogen analysis according to Kjeldahl method of semi-microanalysis showed that HPOA content in this copolymer was 33.9% by weight.

When a couple of dimethyl formamide solutions, one consisting of 10 parts of the foregoing copolymer and 90 parts of polyacrylonitrile and the other consisting of 20 parts of said copolymer and 80 parts of polyacrylonitrile, were made into film and measured as regards their contact angle, electric chargeability and specific degree of stain, they proved to have superior quality compared with homopolymer as shown in Table 6.

Example 27

30 g. of acrylonitrile and 20 g. of N-(ω-hydroxy polyoxyethylene) acrylamide [molecular formula:

$$CH_2=CHCONH(CH_2CH_2O)_{94.7}H$$

hereinafter called HPOA for short] were dissolved in 800 ml. of deionized water, and, after adding thereto 0.4 g. of sulfuric acid, stirring the mixture in the presence of $N_2$ current and heating (at 30–35° C.), 200 ml. of aqueous solution of redox catalyst (comprising 1.71 g. of ammonium persulfate and 0.71 g. of metasodium bisulfite) divided into 6 parts was dripped therein by means of applying these parts at intervals of 30–40 minutes. The resulting white sediment was filtered and dried, whereby there was obtained 42.9 g. of a white copolymer.

Nitrogen analysis according to Kjeldahl method of semi-microanalysis showed that HPOA content in this copolymer was 33.5% by weight.

When a couple of dimethyl formamide solutions, one consisting of 10 parts of the foregoing copolymer and 90 parts of polyacrylonitrile and the other consisting of 20 parts of said copolymer and 80 parts of polyacrylonitrile, were made into film and measured as regards their contact angle, electric chargeability and specific degree of stain, they proved to have superior quality compared with homopolymer as shown in Table 6.

Example 28

30 g. of acrylonitrile and 20 g. of N-(ω-hydroxy polyoxyethyleneoxypropylene) acrylamide [molecular formula:

$$CH_2=CHCONH(CH_2CH_2O)_l\{CH_2-CH(CH_3)O\}_mH,$$

wherein $l+m=35.3$ (mol), $l:m=90:10$ (mol ratio); hereinafter called HPOA for short] were dissolved in 800 ml. of deionized water, after adding thereto 0.4 g. of sulfuric acid, stirring the mixture in the presence of $N_2$ current and heating (at 30–35° C.), 200 ml. of aqueous solution of redox catalyst (comprising 1.71 g. of ammonium persulfate and 0.71 g. of metasodium bisulfite) divided into 6 parts was added dropwise therein by means of applying these parts at intervals of 30–40 minutes. The resulting white sediment was filtered and dried, whereby there was obtained 43.3 g. of a white copolymer. Nitrogen analysis according to Kjeldahl method of semi-microanalysis showed that HPOA content in this copolymer was 35.8% by weight.

When a couple of dimethyl formamide solutions, one consisting of 10 parts of the foregoing copolymer and 90 parts of polyacrylonitrile and the other consisting of 20 parts of said copolymer and 80 parts of polyacrylonitrile, were made into film and measured as regards their contact angle, electric chargeability and specific degree of stain, they proved to have superior quality compared with homopolymer as shown in Table 6.

Example 29

45 g. of acrylonitrile and 5.0 g. of N-(ω-hydroxy polyoxyethyleneoxypropylene) acrylamide [molecular formula:

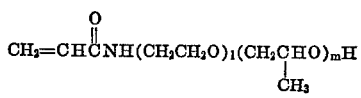

wherein $l+m=97.4$ (mol), $l:m=9:1$ (mol ratio); hereinafter called HPOA for short] were dissolved in 800 ml. of deionized water, and, after adding thereto 0.4 g. of sulfuric acid, stirring the mixture in the presence of $N_2$ current and heating (at 30–35° C.), 200 ml. of aqueous solution of redox catalyst (comprising 1.71 g. of ammonium persulfate and 0.71 g. of metasodium bisulfite) divided into 6 parts was added dropwise therein by means of applying these parts at intervals of 30–40 minutes. The resulting white sediment was filtered and dried, whereby there was obtained 48.9 g. of a white copolymer. Nitrogen analysis according to Kjeldahl method of semi-microanalysis showed that HPOA content in this copolymer was 9.8% by weight.

Further, by making the ratio of acrylonitrile to HPOA to be 98:2 and 95:5 by weight, a couple of copolymers similar to one above were prepared. The weight of HPOA contained in these copolymers were 1.8 and 4.9% respectively. When these copolymers were made into film and measured as regards their contact angle, electric chargeability and specific degree of stain, they proved to have superior quality compared with those homopolymers of acrylonitrile which do not contain the amide according to the present invention, as shown in Table 6. This fact attests to the hydrophilic property, antistatic property and re-staining preventability of the present copolymer.

Example 30

45 g. of acrylonitrile and 5.0 g. of N-(ω-hydroxy polyoxyethyleneoxypropylene) acrylamide [molecular formula:

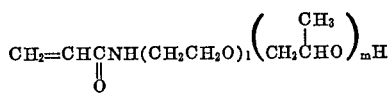

wherein $l+m=49.3$ (mol), $l:m=7:3$ (mol ratio); hereinafter called HPOA for short] were dissolved in 800 ml. of deionized water, and, after adding thereto 0.4 g. of sulfuric acid, stirring the mixture in the presence of $N_2$ current and heating (at 30-35° C.), 200 ml. of aqueous solution of redox catalyst (comprising 1.71 g. of ammonium persulfate and 0.71 g. of metasodium bisulfite) divided into 6 parts were added dropwise therein by means of applying these parts at intervals of 30-40 minutes. The resulting white sediment was filtered and dried, whereby there was obtained 49.2 g. of a white copolymer. Nitrogen analysis according to Kjeldahl method of semi-microanalysis showed that HPOA content in this copolymer was 9.7% by weight.

Further, by making the ratio of acrylonitrile to HPOA to be 98:2 and 95:5 by weight, a couple of copolymers similar to one above were prepared. The weight percent of HPOA contained in these copolymers were 2.0% and 4.8% respectively. When these copolymers were made into film and measured as regards their contact angle, electric chargeability and specific degree of stain, they proved to have superior quality compared with those homopolymers of acrylonitrile which do not contain the amide according to the present invention, as shown in Table 6. This fact attests to the hydrophilic property, antistatic property and re-staining preventability of the present copolymer.

Example 31

45 g. of acrylonitrile and 5.0 g. of N-(ω-hydroxy polyoxyethyleneoxypropylene) acrylamide [molecular formula:

wherein $l+m=10.3$ (mol), $l:m=9:1$ (mol ratio); hereinafter called HPOA for short] were dissolved in 800 ml. of deionized water, and, after adding thereto 0.4 g. of sulfuric acid, stirring the mixture in the presence of $N_2$ current and heating (at 30-35° C.), 200 ml. of aqueous solution of redox catalyst (comprising 1.71 g. of ammonium persulfate and 0.71 g. of metasodium bisulfite) divided into 6 parts was added dropwise therein by means of applying these parts at intervals of 30-40 minutes. The resulting white sediment was filtered and dried, whereby there was obtained 49 g. of a white copolymer. Nitrogen analysis according to Kjeldahl method of semi-microanalysis showed that HPOA content in this copolymer was 10.2% by weight.

Further, by making the ratio of acrylonitrile to HPOA to be 98:2 and 95:5 by weight, a couple of copolymers similar to one above were prepared. The weight percent of HPOA contained in these copolymers were 2.1% and 5.2% respectively. When these copolymers were made into film and measured as regards their contact angle, electric chargeability and specific degree of stain, they proved to have superior quality compared with those homopolymers of acrylonitrile which do not contain the amide according to the present invention, as shown in Table 6. This fact attests to the hydrophilic property, antistatic property and re-staining preventability of the present copolymer.

Example 32

45 g. of acrylonitrile and 5.0 g. of N-(ω-hydroxy polyoxyethyleneoxypropylene) acrylamide [molecular formula:

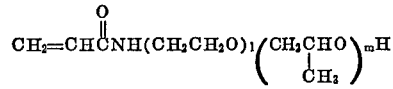

wherein $l+m=48.8$ (mol), $l:m=9:1$ (mol ratio); hereinafter called HPOA for short] were dissolved in 800 ml. of deionized water, and, after adding thereto 0.4 g. of sulfuric acid, stirring the mixture in the presence of $N_2$ current and heating (at 30-35° C.), 200 ml. of aqueous solution of redox catalyst (comprising 1.71 g. of ammonium persulfate and 0.71 g. of metasodium bisulfite) divided into 6 parts was added dropwise therein by means of applying these parts at intervals of 30-40 minutes. The resulting white sediment was filtered and dried, whereby there was obtained 49.0 g. of a white copolymer. Nitrogen analysis according to Kjeldahl method of semi-microanalysis showed that HPOA content in this copolymer was 9.9% by weight.

Further, by making the ratio of acrylonitrile to HPOA to be 98:2 and 95:5 by weight, a couple of copolymers similar to one above were prepared. The weight percent of HPOA contained in these copolymers were 1.9 and 4.9% respectively. When these copolymers were made into film and measured as regards their contact angle, electric chargeability and specific degree of stain, they proved to have superior quality compared with those homopolymers of acrylonitrile which do not contain the amide according to the present invention, as shown in Table 6. This fact attests to the hydrophilic property, antistatic property and re-staining preventability of the present copolymer.

Example 33

45 g. of acrylonitrile and 5.0 g. of N-(α-hydroxy polyoxyethyleneoxypropylene) acrylamide [molecular formula:

wherein $l+m=20.5$ (mol), $l:m=9:1$ (mol ratio); hereinafter called HPOA for short] were dissolved in 800 ml. of deionized water, and, after adding thereto 0.4 g. of sulfuric acid, stirring the mixture in the presence of $N_2$ current and heating (at 30-35° C.), 200 ml. of aqueous solution of redox catalyst (comprising 1.71 g. of ammonium persulfate and 0.71 g. of metasodium bisulfite) divided into 6 parts was added dropwise therein by means of applying these parts at intervals of 30-40 minutes. The resulting white sediment was filtered and dried, whereby there was otbained 49.2 g. of a white copolymer. Nitrogen analysis according to Kjeldahl method of semi-microanalysis showed that HPOA content in this copolymer was 10.1% by weight.

Further, by making the rate of acrylonitrile in HPOA to be 98:2 and 95:5 by weight, a couple of copolymers similar to one above were prepared. The weight percent of HPOA contained in these copolymers were 2.1 and 5.3% respectively. When these copolymers were made into film and measured as regards their contact angle, electric chargeability and specific degree of stain, they proved to have superior quality compared with those homopolymers of acrylonitrile which do not contain the amide according to the present invention, as shown in Table 6. This fact attests to the hydrophilic property, antistatic property and re-staining preventability of the present copolymer.

TABLE 6

| Sample | Amide content percent | Contact angle (Θ°) Contact angle | Contact angle (Θ°) Subaqueous contact angle | Half-decay period of electric chargeability (sec.) | Specific degree of restaining |
|---|---|---|---|---|---|
| Example: |  |  |  |  |  |
| 17 | 10.6 | 50 | 145 | 2.3 | 30 |
|  | 5.3 | 52 | 142 | 2.8 | 38 |
|  | 2.1 | 53 | 143 | 3.6 | 42 |
| 18 | 5.2 | 51 | 143 | 3.4 | 40 |
| 19 | 5.5 | 51 | 142 | 2.9 | 36 |
| 20 | 9.8 | 49 | 146 | 2.1 | 32 |
|  | 5.1 | 51 | 143 | 2.7 | 36 |
|  | 1.9 | 55 | 143 | 2.5 | 40 |
| 21 | 9.9 | 47 | 145 | 2.2 | 33 |
|  | 5.0 | 52 | 143 | 2.1 | 37 |
|  | 1.9 | 54 | 144 | 2.6 | 42 |
| 22 | 9.7 | 48 | 148 | 2.2 | 29 |
|  | 4.9 | 50 | 145 | 2.5 | 34 |
|  | 1.9 | 52 | 144 | 2.4 | 35 |
| 23 | 6.8 | 44 | 153 | 1.8 | 29 |
|  | 3.4 | 48 | 150 | 2.3 | 33 |
| 24 | 6.9 | 43 | 154 | 1.6 | 28 |
|  | 3.5 | 49 | 153 | 2.0 | 32 |
| 25 | 6.8 | 42 | 155 | 1.5 | 27 |
|  | 3.4 | 48 | 152 | 2.1 | 35 |
| 26 | 6.8 | 41 | 153 | 1.4 | 31 |
|  | 3.4 | 46 | 153 | 1.9 | 29 |
| 27 | 6.8 | 41 | 153 | 1.4 | 31 |
|  | 3.4 | 46 | 153 | 1.9 | 29 |
| 28 | 7.2 | 43 | 155 | 1.9 | 28 |
|  | 3.6 | 47 | 154 | 2.1 | 35 |
| 29 | 9.8 | 50 | 145 | 2.5 | 34 |
|  | 4.9 | 53 | 142 | 2.4 | 37 |
|  | 1.8 | 53 | 143 | 2.8 | 41 |
| 30 | 9.7 | 51 | 144 | 2.6 | 33 |
|  | 4.8 | 53 | 142 | 2.9 | 38 |
|  | 2.0 | 55 | 143 | 2.5 | 40 |
| 31 | 10.2 | 52 | 142 | 2.8 | 36 |
|  | 5.2 | 53 | 140 | 2.9 | 40 |
|  | 2.1 | 52 | 142 | 3.1 | 38 |
| 32 | 9.9 | 50 | 144 | 2.9 | 32 |
|  | 4.9 | 53 | 141 | 2.9 | 39 |
|  | 1.9 | 54 | 143 | 3.3 | 43 |
| 33 | 10.1 | 53 | 145 | 2.8 | 31 |
|  | 5.3 | 55 | 143 | 2.7 | 40 |
|  | 2.1 | 56 | 141 | 3.2 | 45 |
| Comparative Example 1: Homopolymer comprising $CH_2=CHCN$ |  | 80 | 127 | ∞ | 100 |
| Comparative Example 2: Copolymer comprising $CH_2=CHCN$ and $CH_2=CHCONH-CH_2CH_2OH$ | 5.3 | 78 | 128 | ∞ | 98 |
| Comparative Example 3: Copolymer comprising $CH_2=CHCN$ and $CH_2=CHCON(CH_2CH_2OH)(CH_2CH_2OH)$ | 5.2 | 79 | 127 | ∞ | 99 |

Remarks:
1. Contact angle: the contact angle in the air relative to water as measured with a goniometer.
2. Subaqueous contact angle: the contact angle in an aqueous solution of the surface active agent.
3. Electric chargeability: the rate of decay of electric charge subsequent to charging a high voltage on a sample.
4. Specific degree of stain: the degree of strain as measured on the basis of regarding the degree of stain in case of polyacrylnitrile as 100%.

Example 34

225 g. of methyl methacrylate, 25 g. of N-(ω-hydroxy polyoxyethylene)-acrylamide [molecular formula:

$$CH_2=CHCONH(CH_2CH_2O)_{10.1}H$$

hereinafter called HPOA for short], 500 g. of toluene and 2.5 g. of azobisisobutyronitrile were placed in a 1-l. four-neck flask equipped with the stirrer, thermometer, condenser and nitrogen inlet, and the reactants were subjected to 8 hours' heating and stirring at 75–80° C. while feeding nitrogen thereto. The reacted solution was poured in abundant methanol, and the white solid matter thus precipitated was filtered and dried. The yield of copolymer was 87.8%. When measured by means of NMR spectrum, the HPOA content in this copolymer was 8.7%. By applying the same process as above, copolymers having HPOA content of 21.3, 14.7 and 3.6%, respectively, were synthesized. When these copolymers were molded at 190° C. under a pressure of 35 atmospheres and measured as regards their contact angle, electric chargeability and surface intrinsic resistibility, they proved to have superior quality compared with those homopolymers which do not contain the amide compound according to the present invention.

Example 35

By effecting copolymerization of 150 g. of methyl methacrylate and 100 g. of N-(ω-hydroxy polyoxyethylene) acrylamide [molecular formula:

$$CH_2=CHCONH(CH_2CH_2O)_{10.1}H$$

hereinafter called HPOA for short] through the same polymerization process as in Example 34, a copolymer with HPOA content of 34.5% was obtained. A couple of mixtures, one consisting of 10 parts of this copolymer and 90 parts of polymethylmethacrylate and the other consisting of 20 parts of said copolymer and 80 parts of polymethylmethacrylate, were respectively subjected to molding at 190° C. under a pressure of 35 atmospheres. Then the molded products were measured as regards their contact angle, electric chargeability and surface intrinsic resistibility. They proved to have suuperior quality as shown in Table 7.

Example 36

225 g. of methyl methacrylate, 25 g. of N-(ω-hydroxy polyoxyethylene) acrylamide [molecular formula:

$$CH_2=CHCONH(CH_2CH_2O)_{20.7}H$$

hereinafter called HPOA for short], 500 g. of toluene and 2.5 g. of azobisisobutyronitrile were stocked in a 1-l. four-neck flask equipped with the stirrer, thermometer, condenser and nitrogen inlet, and the reactants were subjected to 8 hours' heating and stirring at 75–80° C. while feeding nitrogen thereto. The reacted solution was poured in abundant methanol, and the white solid matter thus precipitated was filtered and dried. The yield of copolymer was 85.2%. When measured by means of NMR spectrum, the HPOA content in this copolymer was 8.3%. By applying the same process as above, copolymers having HPOA content of 20.9, 15.3 and 3.4%, respectively, were synthesized. When these copolymers were molded at 190° C. under a pressure of 35 atmospheres and measured as regards their contact angle, electric chargeability and surface intrinsic resistibility, they proved to have superior quality compared with homopolymers as shown in Table 7.

Example 37

By effecting copolymerization of 150 g. of methyl methacrylate and 100 g. of N-(ω-hydroxy polyoxyethylene) acrylamide [molecular formula:

$$CH_2=CHCONH(CH_2CH_2O)_{20.7}H$$

hereinafter called HPOA for short] through the same polymerization process as in Example 36, a copolymer with HPOA content of 34.3% was obtained. A couple of mixtures, one consisting of 10 parts of this copolymer and 90 parts of polymethylmethacrylate and the other consisting of 20 parts of said copolymer and 80 parts of polymethylmethacrylate, were respectively subjected to molding at 190° C. under a pressure of 35 atmospheres. When the thus molded products were measured of their contact angle, electric chargeability and surface intrinsic resistibility, they proved to have superior quality as shown in Table 7.

Example 38

225 g. of methylmethacrylate, 25 g. of N-(ω-hydroxy polyoxyethylene) acrylamide [molecular formula: $CH_2=CHCONH(CH_2CH_2O)_{33.3}H$, hereinafter called HPOA for short], 500 g. of toluene and 2.5 g. of azobisisobutyronitrile were placed in a 1-l. four-neck flask equipped with the stirrer, thermometer, condenser and nitrogen inlet, and reactants were subjected to 8 hours' heating and stirring at 75–80° C. while feeding nitrogen thereto. The reacted solution was poured in abundant methanol, and the white solid matter thus precipitated was filtered and dried. The yield of copolymer was 85.6%. When measured by means of NMR spectrum, the HPOA content in this copolymer was 8.4%. By applying the same process as above, copolymers having HPOA content of 22.3, 5.2 and 3.5%, respectively, were synthesized. When these copolymers were molded at 190° C. under a pressure of 35 atmospheres and the products were measured as regards their contact angle, electric chargeability and surface intrinsic resistibility, they proved to have superior quality compared with homopolymers as shown in Table 7.

Example 39

By effecting copolymerization of 150 g. of methylmethacrylate and 100 g. of N-(ω-hydroxy polyoxyethylene) acrylamide [molecular formula:

$$CH_2=CHCONH(CH_2CH_2O)_{33.3}H$$

hereinafter called HPOA for short] through the same polymerization process as in Example 38, a copolymer with HPOA content of 33.9% was obtained. A couple of mixtures, one consisting of 10 parts of this copolymer and 90 parts of polymethylmethacrylate and the other consisting of 20 parts of said copolymer and 80 parts of polymethylmethacrylate were respectively subjected to molding at 190° C. under a pressure of 35 atmospheres. When the thus molded products were measured as regards their contact angle, electric chargeability and surface intrinsic resistibility, they proved to have superior quality as shown in Table 7.

Example 40

225 g. of methylmethacrylate, 25 g. of N-(ω-hydroxy polyoxyethylene) acrylamide [molecular formula:

$$CH_2=CHCONH(CH_2CH_2O)_{47.6}H$$

hereinafter called HPOA for short], 500 g. of toluene and 2.5 g. of azobisisobutyronitrile were placed in a 1-l. four-neck flask equipped with the stirrer, thermometer, condenser and nitrogen inlet, and the reactants were subjected to 8 hours' heating and stirring at 75–80° C. while feeding nitrogen thereto. The reacted solution was poured in abundant methanol, and the white solid matter thus precipitated was filtered and dried. The yield of copolymer was 84.8%. When measured by means of NMR spectrum, the HPOA content in this copolymer was 8.1%. By applying the same process as above, copolymers having HPOA content of 20.3, 14.3 and 3.2%, respectively, were synthesized. When these copolymers were molded at 190° C. under a pressure of 35 atmospheres and the products were measured as regards their contact angle, electric chargeability and surface intrinsic resistibility, they proved to have superior quality compared with homopolymers as shown in Table 7.

Example 41

By effecting copolymerization of 150 g. of methylmethacrylate and 100 g. of N-(ω-hydroxy polyoxyethylene) acrylamide [molecular formula:

$$CH_2=CHCONH(CH_2CH_2O)_{47.6}H$$

hereinafter called HPOA for short] through the same polymerization process as in Example 40, a copolymer with HPOA content of 33.3% was obtained. A couple of mixtures, one consisting of 10 parts of this copolymer and 90 parts of polymethylmethacrylate and the other consisting of 20 parts of said copolymer and 80 parts of polymethylmethacrylate, were respectively subjected to molding at 190° C. under a pressure of 35 atmospheres. When the thus molded products were meaasured as re-

Example 42

225 g. of methylmethacrylate, 25 g. of N-(ω-hydroxy polyoxyethylene) acrylamide [molecular formula:

$$CH_2=CHCONH(CH_2CH_2O)_{94.7}H$$

hereinafter called HPOA for short], 500 g. of toluene and 2.5 g. of azobisisobutyronitrile were placed in a 1-l. four-neck flask equipped with the stirrer, thermometer, condenser and nitrogen inlet, and the reactants were subjected to 8 hours' heating and stirring at 75–80° C. while feeding nitrogen thereto. The reacted solution was poured in abundant methanol, and the white solid matter thus precipitated was filtered and dried. The yield of copolymer was 82.9%. When measured by means of NMR spectrum, the HPOA content in this copolymer was 7.9%. By applying the same process as above, copolymers having HPOA content of 19.9, 13.7 and 3.0%, respectively, were synthesized. When these copolymers were molded at 190° C. under a pressure of 35 atmospheres and the products were measured as regards their contact angle, electric chargeability and surface intrinsic resistibility, they proved to have superior quality compared with homopolymers as shown in Table 7.

Example 43

By effecting copolymerization of 150 g. of methylmethacrylate and 100 g. of N-(ω-hydroxy polyoxyethylen) acrylamide [molecular formula:

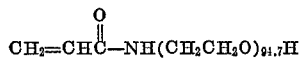

hereinafter called HPOA for short] through the same polymerization process as in Example 42, a copolymer with HPOA content of 32.9% was obtained. A couple of mixtures, one consisting of 10 parts of this copolymer and 90 parts of polymethylmethacrylate and the other consisting of 20 parts of said copolymer and 80 parts of polymethylmethacrylate, were respectively subjected to molding at 190° C. under a pressure of 35 atmospheres. When the thus molded products were measured as regards their contact angle, electric chargeability and surface intrinsic resistibility, they proved to have superior quality as shown in Table 7.

Example 44

225 g. of methylmethacrylate, 25 g. of N-(ω-hydroxy polyoxyethylene-oxypropylene) acrylamide [molecular formula:

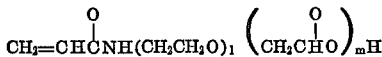

wherein $l+m=35.3$ (mol), $l:m=9:1$ (mol ratio); hereinafter called HPOA for short], 150 g. of toluene and 2.5 g. of azobisisobutyronitrile were placed in a 1-l. four-neck flask equipped with the stirrer, therometer, condenser and nitrogen inlet, and the reactants were subjected to 8 hours' heating and stirring at 70–80° C. while feeding nitrogen thereto. The reacted solution was poured in abundant methanol, and the white solid matter thus precipitated was filtered and dried. The yield of copolymer was 87.9%. When measured by means of NMR spectrum, the HPOA content in this copolymer was 8.6%. By applying the same process as above, copolymers having HPOA content of 24.8, 15.7 and 3.8%, respectively, were synthesized. When these copolymers were molded at 190° C. under a pressure of 35 atmospheres and the molded products were measured as regards their contact angle, electric chargeability and surface intrinsic resistibility, they proved to have superior quality compared with homopolymers as shown in Table 7.

Example 45

By effecting copolymerization of 150 g. of methylmethacrylate and 100 g. of N-(ω-hydroxy polyoxyethylene-oxypropylene) acrylamide [molecular formula:

wherein $l+m=35.3$ (mol), $l:m=9:1$ (mol ratio); hereinafter called HPOA for short] through the same polymerization process as in Example 44, a copolymer with HPOA content of 35.1% was obtained. A couple of mixtures, one consisting of 10 parts of this copolymer and 90 parts of methyl polymethylmethacrylate and the other consisting of 20 parts of said copolymer and 80 parts of polymethylmethacrylate, were respectively subjected to molding at 190° C. under a pressure of 35 atmospheres. When the thus molded products were measured as regards their contact angle, electric chargeability and surface intrinsic resistibility, they proved to have superior quality compared with homopolymers as shown in Table 7.

TABLE 7

| Sample | Amide content (percent) | Contact angle (θ°) | Half-decay period of electric chargeability (sec.) | Surface intrinsic resistibility (ρ⁻) |
|---|---|---|---|---|
| Example: | | | | |
| 34 | 21.3 | 48 | 1.9 | 9.3×10⁹ |
|    | 14.7 | 53 | 3.4 | 1.1×10¹⁰ |
|    | 8.7  | 56 | 3.3 | 3.5×10¹⁰ |
|    | 3.6  | 58 | 4.8 | 7.0×10¹⁰ |
| 35 | 6.9 | 53 | 2.8 | 2.3×10¹⁰ |
|    | 3.5 | 55 | 3.6 | 1.4×10¹¹ |
| 36 | 20.9 | 46 | 1.8 | 7.4×10⁹ |
|    | 15.3 | 49 | 2.0 | 6.7×10¹⁰ |
|    | 8.3  | 50 | 3.7 | 3.9×10¹¹ |
|    | 3.4  | 52 | 2.9 | 9.8×10¹⁰ |
| 37 | 6.8 | 50 | 1.9 | 8.8×10⁹ |
|    | 3.4 | 52 | 3.5 | 9.5×10¹⁰ |
| 38 | 22.3 | 47 | 1.7 | 3.8×10¹⁰ |
|    | 15.2 | 48 | 2.0 | 9.0×10⁹ |
|    | 8.4  | 54 | 4.0 | 4.5×10¹¹ |
|    | 3.5  | 53 | 2.9 | 6.8×10¹⁰ |
| 39 | 6.7 | 49 | 1.5 | 9.9×10⁹ |
|    | 3.4 | 53 | 2.3 | 7.9×10¹⁰ |
| 40 | 20.3 | 48 | 2.3 | 5.3×10¹⁰ |
|    | 14.3 | 48 | 2.0 | 8.3×10⁹ |
|    | 8.1  | 55 | 3.0 | 6.7×10¹⁰ |
|    | 3.2  | 55 | 4.9 | 8.8×10¹⁰ |
| 41 | 6.6 | 47 | 1.8 | 9.2×10⁹ |
|    | 3.3 | 49 | 1.9 | 2.5×10¹⁰ |
| 42 | 19.9 | 45 | 1.9 | 3.3×10¹⁰ |
|    | 13.7 | 46 | 1.7 | 7.7×10⁹ |
|    | 7.9  | 49 | 3.4 | 5.0×10¹⁰ |
|    | 3.0  | 55 | 4.2 | 8.7×10¹⁰ |
| 43 | 6.6 | 48 | 2.5 | 9.5×10⁹ |
|    | 3.3 | 50 | 3.3 | 2.8×10¹⁰ |
| 44 | 24.8 | 54 | 4.0 | 1.8×10¹⁰ |
|    | 15.7 | 54 | 4.0 | 6.5×10¹⁰ |
|    | 8.6  | 57 | 4.5 | 9.8×10¹⁰ |
|    | 3.8  | 58 | 4.8 | 1.1×10¹⁰ |
| 45 | 7.0 | 54 | 4.2 | 2.9×10¹⁰ |
|    | 3.5 | 58 | 4.4 | 8.5×10¹⁰ |
| Comparative Example 1: Homopolymer comprising 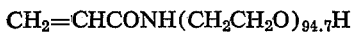 | | 79 | ∞ | 10¹⁵ |

Remarks:
1. Contact angle: the contact angle in air relative to water as measured with a goniometer.
2. Electric chargeability: the rate of decay of electric charge subsequent to charging a high voltage on a sample.

Example 46

146.9 g. of vinyl chloride, 7.3 g. of N-(ω-hydroxy polyoxyethylene)-acrylamide [molecular formula:

hereinafter called HPOA for short], 2 wt. percent of azobisisobutyronitrile and 200 ml. of tetrahydrofuran were placed in a 500 ml. glass autoclave and subjected to 10 hours' copolymerization at 60° C. After finishing the reaction, the reacted solution was added dropwise into abundant methanol while stirring, and the resulting precipitate was filtered and dried. Chlorine analysis of the copolymer thus obtained showed that it was composed of 94.4% of vinyl chloride and 5.6% of HPOA. When this copolymer was made into film and the surface properties of said film were measured, it was superior to the homopolymer of vinyl chloride as shown in Table 8. A couple of copolymers having HPOA content of 11.7% and 19.8% by weight, respectively, were synthesized and made into film by applying the same process as above, whereby the surface properties were measured. Further, N-(ω-hydroxy polyoxyalkylene) acrylamides having oxyalkylene chain of different type were also subjected to the same measurement as above. The results proved that they were all possessed of superior surface properties as shown in Table 8.

Example 47

By the use of N-(ω-hydroxy polyoxyethylene) acrylamide [molecular formula:

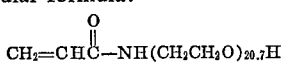

hereinafter called HPOA for short], a coplymer having HPOA content of 43.8% was synthesized through the same process as in Example 46.

When a couple of mixtures, one consisting of 10 parts of this copolymer and 90 parts of polyvinyl chloride and the other consisting of 20 parts of said copolymer and 80 parts of polyvinyl chloride, were made into film and measured as regards their surface properties, they proved to have superior properties as shown in Table 8.

Further, various copolymers of N-(ω-hydroxy polyoxyalkylene)acrylamides having oxyalkylene chain of different type were synthesized through the same process as above and the surface properties of blend polymers thereof were measured. The result was as shown in Table 9.

TABLE 8.—COPOLYMER COMPRISING VINYL CHLORIDE
(Example 46)

| Oxyalkylene chain (A) | Amide content (percent) | Contact angle ($\theta°$) | Half-decay period of electric chargeability (sec.) |
|---|---|---|---|
| $-(CH_2CH_2O)_{20.7}H$ | 19.8 | 44 | 1.7 |
|  | 11.7 | 45 | 2.0 |
|  | 5.6 | 49 | 3.5 |
| $-(CH_2CH_2O)_{33.3}H$ | 22.5 | 47 | 1.9 |
|  | 10.8 | 46 | 2.9 |
|  | 3.9 | 51 | 3.0 |
| $-(CH_2CH_2O)_{47.6}H$ | 20.8 | 45 | 2.1 |
|  | 12.5 | 51 | 3.5 |
|  | 4.3 | 49 | 2.7 |
| $-(CH_2CH_2O)_{94.7}H$ | 20.5 | 44 | 1.8 |
|  | 13.7 | 53 | 1.9 |
|  | 4.9 | 48 | 2.8 |
|  | 23.8 | 48 | 2.5 |
| 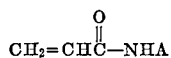 | 12.8 | 52 | 3.5 |
| wherein: $l+m=35.3$ (mol), $l:m=9.1$ (mol ratio) | 3.6 | 54 | 4.0 |
| Comparative example: Homopolymer comprising $CH_2=CHCl$. |  | 78 | ∞ |

Remarks:
1. Oxyalkylene chain (A)—represents A in the general formula $$CH_2=CHC(=O)-NHA$$

2. Contact angle: Contact angle in the air relative to water as measured with a goniometer.
3. Electric chargeability: The rate of decay of electric charge subsequent to charging a high voltage on a sample.

TABLE 9
(Example 47)

| Sample | Copolymer Amide content (percent) | Blend ratio of copolymer (percent) | Contact angle ($\theta°$) | Half-decay period of electric chargeability (sec.) |
|---|---|---|---|---|
| Copolymer of— $CH_2=CHCl$ and $CH_2=CHCONH(CH_2CH_2O)_{20.7}H$ | 43.8 | 20 | 44 | 1.9 |
|  |  | 10 | 48 | 2.8 |
| Copolymer of— $CH_2=CHCl$ and $CH_2=CHCONH(CH_2CH_2O)_{33.3}H$ | 38.7 | 20 | 43 | 2.0 |
|  |  | 10 | 47 | 3.1 |
| Copolymer of— $CH_2=CHCl$ and $CH_2=CHCONH(CH_2CH_2O)_{47.6}H$ | 40.8 | 20 | 42 | 1.8 |
|  |  | 10 | 49 | 2.9 |
| Copolymer of— $CH_2=CHCl$ and $CH_2=CHCONH(CH_2CH_2O)_{94.7}H$ | 42.3 | 20 | 45 | 2.2 |
|  |  | 10 | 49 | 2.7 |
| Copolymer of— $CH_2=CHCl$ and 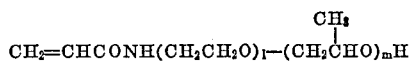 | 44.4 | 20 | 47 | 2.4 |
|  |  | 10 | 52 | 3.2 |
| wherein: $l+m=35.4$ (mol), $l:m=9:1$ (mol ratio) |  |  |  |  |
| Comparative example: Homopolymer comprising $CH_2=CHCl$. |  |  | 78 | X |

Remarks:
1. Contact angle: Contact angle in the air relative to water as measured with a goniometer.
2. Electric chargeability: The rate of decay of electric charge subsequent to charging a high voltage on a sample.

Example 48

2 parts of azobisisobutyronitrile as the polymerization initiator was dissolved in a mixture of 180 parts of styrene and 20 parts of N-(ω-hydroxy polyoxyethylene) acrylamide [molecular formula:

hereinafter called HPOA for short], whereby nitrogen substitution was effected sufficiently, and thereafter, the mixture was subjected to polymerization at 70° C. for 3 hours first and subsequently at 150° C. for 5 hours. The transformation ratio was 98%. The reaction product was dissolved in toluene and then was poured into abundant methanol, whereby a powdery copolymer was obtained. NMR analysis of this copolymer after refining thereof showed that the HPOA content was 8.5% by weight. When this copolymer was molded under the pressure of 50 kg./cm.$^2$ at 190° C. and measured as regards the surface properties thereof, it proved to have superior properties as shown in Table 9. A couple of copolymers having HPOA content of 4.2 and 22.5% by weight, respectively, were synthesized and the same measurement as above was conducted thereon. Further, various copolymers of N-(ω-hydroxy polyoxyalkylene) acrylamide having oxyalkylene chain of different type were also synthesized and subjected to the same measurement. The results proved that they were all possessed of superior properties as shown in Table 10.

Example 49

By the use of 100 parts of styrene and 100 parts of N-(ω-hydroxy polyoxyethylene) acrylamide [molecular formula:

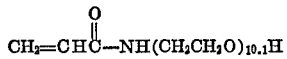

hereinafter called HPOA for short] and through the same process as in Example 48, a copolymer having HPOA content of 43.5% by weight was synthesized.

When a couple of mixtures, one consisting of 10 parts of this copolymer and 90 parts of polystyrene and the other consisting of 20 parts of said copolymer and 80 parts of polystyrene, were pressure molded under the condition of 190° C. and 50 kg./cm.$^2$, respectively, and measured as regards the surface properties thereof, the results were superior as shown in Table 9. Further, various copolymers of N-(ω-hydroxy polyoxyalkylene) acrylamides having oxyalkylene chain of different type were also measured of surface properties of their blend polymers, and the result was as shown in Table 11.

TABLE 10.—COPOLYMER COMPRISING STYRENE
(Example 48)

| Oxyalkylene chain (A) | Amide content (percent) | Contact angle (θ°) | Half-decay period of electric chargeability (sec.) |
| --- | --- | --- | --- |
| —(CH$_2$CH$_2$O)$_{10.1}$H | 22.5 | 48 | 3.3 |
|  | 8.5 | 53 | 3.8 |
|  | 4.2 | 58 | 4.5 |
| —(CH$_2$CH$_2$O)$_{20.7}$H | 23.8 | 45 | 3.0 |
|  | 7.9 | 51 | 3.5 |
|  | 3.2 | 54 | 5.1 |
| —(CH$_2$CH$_2$O)$_{33.3}$H | 21.6 | 47 | 2.8 |
|  | 9.3 | 52 | 3.8 |
|  | 3.7 | 57 | 4.5 |
| —(CH$_2$CH$_2$O)$_{47.6}$H | 23.7 | 49 | 2.5 |
|  | 10.3 | 53 | 4.0 |
|  | 2.9 | 59 | 5.5 |
| —(CH$_2$CH$_2$O)$_{94.7}$H | 19.9 | 45 | 2.9 |
|  | 8.5 | 51 | 3.7 |
|  | 2.5 | 56 | 4.3 |
| —(CH$_2$CH$_2$O)$_l$(CH$_2$CHO)$_m$H<br>　　　　　　　　　｜<br>　　　　　　　　　CH$_3$ | 20.8 | 49 | 2.8 |
|  | 8.2 | 53 | 4.7 |
| wherein:<br>$l+m=35.3$ (mol)<br>$l:m=9:1$ (mol ratio) | 2.6 | 60 | 7.5 |
| Comparative example: Styrene homopolymer. |  | 78 | ∞ |

Remarks:
1. Oxyalkylene chain (A)—represents A in the general formula $$CH_2=CH-\overset{O}{\overset{\|}{C}}-NHA$$

2. Contact angle: Contact angle in the air relative to water as measured with a goniometer.
3. Electric chargeability: The rate of decay of electric charge subsequent to charging a high voltage on a sample.

TABLE 11
(Example 49)

| Sample (Copolymer) | Amide content (percent) | Blend ratio of copolymer (percent) | Contact angle (θ°) | Half-decay period of electric chargeability (sec.) |
| --- | --- | --- | --- | --- |
| Copolymer of—<br>Styrene and<br>CH$_2$=CH—$\overset{O}{\overset{\|}{C}}$—NH(CH$_2$CH$_2$O)$_{10.1}$H | 36.7 | 20 | 50 | 3.3 |
|  |  | 10 | 53 | 4.5 |
| Copolymer of—<br>Styrene and<br>CH$_2$=CH$\overset{O}{\overset{\|}{C}}$—NH(CH$_2$CH$_2$O)$_{20.7}$H | 33.5 | 20 | 49 | 3.0 |
|  |  | 10 | 55 | 5.2 |
| Copolymer of—<br>Styrene and<br>CH$_2$=CH$\overset{O}{\overset{\|}{C}}$NH(CH$_2$CH$_2$O)$_{33.3}$H | 39.5 | 20 | 48 | 2.8 |
|  |  | 10 | 56 | 4.7 |
| Copolymer of—<br>Styrene and<br>CH$_2$=CH$\overset{O}{\overset{\|}{C}}$NH(CH$_2$CH$_2$O)$_{47.6}$H | 34.3 | 20 | 51 | 3.1 |
|  |  | 10 | 54 | 5.3 |
| Copolymer of—<br>Styrene and | 36.6 | 20 | 47 | 3.3 |
|  |  | 10 | 53 | 4.2 |

See footnote at end of table.

TABLE 11—Continued

| Sample | Copolymer Amide content (percent) | Blend polymer Blend ratio of copolymer (percent) | Contact angle (θ°) | Half-decay period of electric chargeability (sec.) |
|---|---|---|---|---|
| Copolymer of— Styrene and $CH_2=CHCONH(CH_2CH_2O)_{64.7}H$ | 35.8 | 20 | 52 | 4.9 |
|  |  | 10 | 58 | 7.3 |
| $CH_2=CHCONH(CH_2CH_2O)_l-(CH_2CHO)_mH$ wherein: $l+m=35.3$ (mol) $l:m=9:1$ (mol ratio) |  |  |  |  |
| Comparative example: Styrene homopolymer |  |  | 80 | ∞ |

Remarks:
1. Contact angle: Contact angle in the air relative to water as measured with a goniometer.
2. Electric chargeability: The rate of decay of electric charge subsequent to charging a high voltage on a sample.

What is claimed is:

1. A process for preparing ethylenically unsaturated amide of the formula

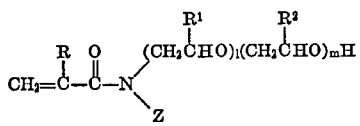

wherein R, $R^1$ and $R^2$ each represent H or alkyl having 1 to 4 carbon atoms, and $R^1$ and $R^2$ can be identical or different; Z is H, alkyl having 1 to 12 carbon atoms, phenyl, alkylaryl in which the alkyl has 1 to 12 carbon atoms, aryl alkyl in which the alkyl has 1 to 12 carbon atoms, cycloalkyl having 3 to 6 carbon atoms or

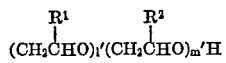

$l$, $l'$, $m$ and $m'$ each represent an integer, such that $l+m$ and $l'+m'$ each range from 2 to 100,
which comprises: reacting
(A) a compound of the formula

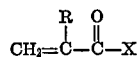

wherein R has the same meaning as above and X is halogen, with
(B) a compound of the formula

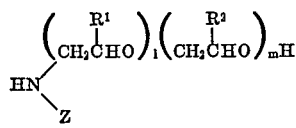

wherein $R^1$, $R^2$, Z, $l$ and $m$ have the same meaning as above, in the presence of
(C) a compound of the formula

wherein $R^3$, $R^4$ and $R^5$ each represent

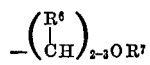

alkyl having 1 to 12 carbon atoms, phenyl or aralkyl in which the alkyl has 1 to 12 carbon atoms, provided that at least one of $R^3$, $R^4$ and $R^5$ is

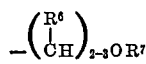

and wherein $R^6$ is H or alkyl having 1 to 3 carbon atoms, and $R^7$ is H or alkyl having 1 to 12 carbon atoms,
and then recovering from the reaction mixture the ethylenically unsaturated amide product.

2. A method according to claim 1, in which R is H or $CH_3$ and X is Cl.

3. A method according to claim 1, in which each of $R^1$ and $R^2$ is H or $CH_3$, $l+m$ is from 5 to 100, and Z is H, alkyl having 1 to 6 carbon atoms, phenyl, benzyl or cyclohexyl.

4. A method according to claim 3, in which Z is H.

5. A method according to claim 4, in which $R^1$ and $R^2$ both are H, and $l+m$ is from 30 to 50.

6. A method according to claim 1, in which each of $R^3$, $R^4$ and $R^5$ has the formula

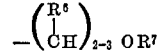

wherein $R^6$ is H or alkyl having 1 to 3 carbon atoms, and $R^7$ is H or alkyl having 1 to 12 carbon atoms.

7. A method according to claim 1, in which each of $R^3$, $R^4$ and $R^5$ is —$CH_2CH_2OH$.

8. A method according to claim 1, in which the reaction is carried out in the liquid phase with the reactants dissolved in an inert solvent, at a temperature from —5° C. to about 20° C., for a time period of from 0.5 to 3 hours, and the produced hydrohalogenated salt of (C) is removed by filtration.

9. A process for preparing ethylenically unsaturated amide of the formula

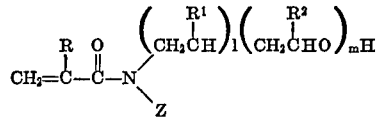

wherein R, $R^1$ and $R^2$ each represent H or alkyl having 1 to 4 carbon atoms, and $R^1$ and $R^2$ can be identical or different; Z is H, alkyl having 1 to 12 carbon atoms, phenyl, alkylaryl in which the alkyl has 1 to 12 carbon atoms, aryl alkyl in which the alkyl has 1 to 12 carbon atoms, cycloalkyl having 3 to 6 carbon atoms or

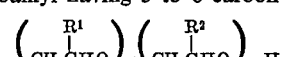

$l$, $l'$, $m$ and $m'$ each represent an integer such that $l+m$ and $l'+m'$ each range from 2 to 100,
which comprises: reacting
(A) a compound of the formula

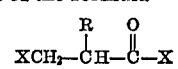

wherein R has the same meaning as above and X is halogen, with (B) a compound of the formula

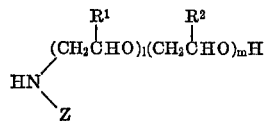

wherein $R^1$, $R^2$, Z, $l$ and $m$ have the same meaning as above, in the presence of (C) a compound of the formula

wherein $R^3$, $R^4$ and $R^5$ each represent

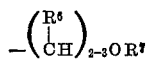

alkyl having 1 to 12 carbon atoms, phenyl or aralkyl in which the alkyl has 1 to 12 carbon atoms, provided that at least one of $R^3$, $R^4$ and $R^5$ is

and wherein $R^6$ is H or alkyl having 1 to 3 carbon atoms, and $R^7$ is H or alkyl having 1 to 12 carbon atoms, then separating from the reaction mixture the produced hydrohalogenated salt of (C), then treating the remaining reaction mixture with a strong alkali, and thereafter recovering the ethylenically unsaturated amide product.

10. A method according to claim 9, in which R is H or $CH_3$ and X is Cl.

11. A method according to claim 9, in which each of $R^1$ and $R^2$ is H or $CH_3$, $l+m$ is from 5 to 100, and Z is H, alkyl having 1 to 6 carbon atoms, phenyl, benzyl or cyclohexyl.

12. A method according to claim 11, in which Z is H.

13. A method according to claim 12, in which $R^1$ and $R^2$ both are H, and $l+m$ is from 30 to 50.

14. A method according to claim 9, in which each of $R^3$, $R^4$ and $R^5$ has the formula

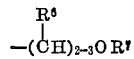

wherein $R^6$ is H or alkyl having 1 to 3 carbon atoms, and $R^7$ is H or alkyl having 1 to 12 carbon atoms.

15. A method according to claim 9, in which each of $R^3$, $R^4$ and $R^5$ is $-CH_2CH_2OH$.

16. A method according to claim 9, in which the reaction is carried out in the liquid phase with the reactants dissolved in an inert solvent, at a temperature from $-5°$ C. to about $20°$ C., for a time period of from 0.5 to 3 hours, and the produced hydrohalogenated salt of (C) is removed by filtration.

17. A method according to claim 1, in which the strong alkali is sodium hydroxide or potassium hydroxide.

References Cited
UNITED STATES PATENTS

| | | | |
|---|---|---|---|
| 3,037,056 | 5/1962 | Lowe et al. | 260—561 N |
| 2,288,197 | 6/1942 | Kränzlein et al. | 260—561 N X |
| 3,024,260 | 3/1962 | Ernst | 260—404 |

LEWIS GOTTS, Primary Examiner

E. G. LOVE, Assistant Examiner

U.X. Cl. X.R.

260—78.5, 874

UNITED STATES PATENT OFFICE
CERTIFICATE OF CORRECTION

Patent No. 3,776,956          Dated December 4, 1973

Inventor(s) Izumi Yamane, Daini Saika, and Susumu Tomidokoro

It is certified that error appears in the above-identified patent and that said Letters Patent are hereby corrected as shown below:

Col. 27, line 63; change the formula to read as follows:

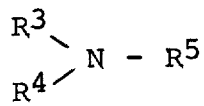

Col. 28, line 57; change the formula to read as follows:

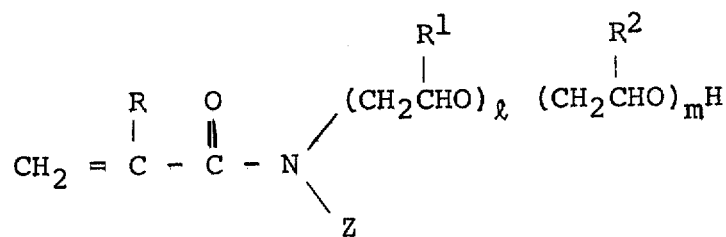

Signed and sealed this 23rd day of April 1974.

(SEAL)
Attest:

EDWARD M. FLETCHER, JR.
Attesting Officer

C. MARSHALL DANN
Commissioner of Patents